United States Patent [19]

Skolnick

[11] 4,230,763

[45] Oct. 28, 1980

[54] OPEN WEAVE DRAPERY FABRIC IN ASSOCIATION WITH A SOLAR LIGHT-CONTROL FILM

[75] Inventor: Barry Skolnick, East Windsor, N.J.

[73] Assignee: Saxon Industries, Inc., New York, N.Y. 10020

[21] Appl. No.: 867,148

[22] Filed: Jan. 5, 1978

[51] Int. Cl.$^2$ ............... A47H 23/08; A47H 23/10; B32B 3/02; B32B 33/00

[52] U.S. Cl. ............... 428/246; 106/DIG. 7; 428/261; 428/334; 428/335; 428/336; 428/337; 428/339; 428/458

[58] Field of Search ............... 106/DIG. 7; 428/246, 428/261, 334, 335, 336, 337, 339, 458

[56] References Cited

U.S. PATENT DOCUMENTS

| | | | |
|---|---|---|---|
| 4,013,812 | 3/1977 | Geiger | 428/245 |
| 4,032,681 | 6/1977 | Jonnes | 428/914 |

OTHER PUBLICATIONS

Anderson, et al. *The Solar Home Book,* Cheshire Books, Harrisville, New Hampshire, p. 230 (1976).

*Primary Examiner*—James C. Cannon

[57] ABSTRACT

An improved drapery fabric, constructed of an open weave decorative fabric adhesively-bonded by a flexible inner bonding stratum to a flexible solar control film. The solar control film permits visible light transmission through the open weave decorative fabric and reduces heat loss, or gain, by reducing the flow of heat and air therethrough. In addition, the improved open weave drapery fabric reduces heat loss during winter months through the combined effects of reflective and barrier characteristics, as well as the stagnant air space created between the window glass and the improved drape.

10 Claims, 4 Drawing Figures

SUMMER CONDITIONS

WINTER CONDITIONS

OPEN WEAVE DRAPERY FABRIC IN ASSOCIATION WITH A SOLAR LIGHT-CONTROL FILM

The present invention relates to an improved window covering which serves to reduce the flow of heat and air therethrough, while permitting visible light transmission and eliminating much of the ultraviolet radiation and rejecting most of the heat produced by solar radiation. More particularly, this invention relates to an improved open weave drapery fabric comprising an open weave decorative fabric adhesively-bonded by a flexible inner bonding stratum to a solar control film.

It is a common practice to provide a decorative fabric, such as a drapery fabric, on the interior side of a window at some distance therefrom for decorative purposes, as well as to eliminate or reduce visible light transmission and reduce the flow of heat and air between the window and the room. Often, for decorative purposes, such draperies are open or semi-open weave fabrics which permit a certain amount of visible light transmission therethrough. The amount of visible light transmitted through the decorative fabric will generally be directly proportional to the amount of open area of the fabric. However, the ability of the fabric to reduce the flow of heat and air will generally be inversely proportional to the amount of open area of the fabric.

Attempts have been made to improve the heat transmission characteristics of drapery fabrics by incorporating metallic particles therein to reflect light, i.e., to reduce heat radiation. For example, U.S. Pat. No. 2,630,620 describes a product wherein a pliable, porous, heat-reflective fabric is produced by applying heat-reflective metallic flakes to one side of the fabric; and U.S. Pat. No. 2,921,864 describes a process for vaporizing and depositing a vaporizable metal onto a fabric. The object of the foregoing patents is to provide the fabric with the ability to reflect radiated light, while maintaining the porosity (open area) and pliability ("the hand") of the original fabric. In both patents, however, the fabric must have a certain amount of open area in order to maintain the hand of the original fabric and allow for the transmission of visible light. As a result of the open area, heat losses due to the flow of heat and air through the fabric are not appreciably reduced.

Solar control films are well-known in the art and have been described in many patents, including U.S. Pat. Nos. 3,069,301; 3,290,203; 3,398,040; 3,429,733; and 3,775,226. The known types of solar control films are designed primarily for application directly to a glass window in order to reduce the transmission of infrared, visible and ultraviolet radiation from the sun.

The primary object of this invention is to provide an improved window covering which reduces heat losses by reducing the flow of radiant heat and conducted or convected hot air therethrough and additionally permitting controlled visible light transmission.

It is another object of this invention to provide a window treatment which has improved room insulating characteristics.

The improved window covering of this invention is comprised of an open weave decorative fabric adhesively-bonded by a flexible inner bonding stratum to a flexible solar control film. As used herein, the term "solar control film" generally means any continuous film which controls infrared, visible and ultraviolet radiation from the sun. The solar control film should have a visible light transmission level which permits light transmission through the decorative fabric. Preferably, the visible light transmission level should be from about three percent (3%) to about fifty percent (50%).

As used herein, the term "open weave" as applied to the window covering generally means a decorative fabric or other material having a sufficiently high open area to permit the transmission of visible light through the fabric, more specifically a decorative fabric having at least, but not limited to, about five percent (5%) open area. Although, in a preferred embodiment, the open weave material is a drapery fabric, it will be understood by those persons skilled in the art that the invention is equally applicable to shades, shutters, curtains and other materials made of cloth, plastic, wood or the like which are constructed so as to provide an open area which permits the passage of light and air.

The improved open weave drapery fabric of this invention unexpectedly exhibits superior properties with respect to the control of heat loss and gain through a window, as compared to the use of either a solar control film or an open weave decorative fabric on the same window. Moreover, the improved drapery fabric of the invention is constructed so as to substantially maintain the original hand of at least one surface of the decorative fabric and the original draping qualities of the decorative fabric.

The invention will be further understood by reference to the drawings, wherein:

FIG. 4 is a perspective view of the solar control fabric of this invention in use.

FIG. 1 depicts one embodiment of the improved drapery fabric, wherein a solar control film (1) comprising a polymeric layer (4) and a layer of metal (5) is bonded to an open weave fabric (2) by an adhesive layer (3).

Figure 1:
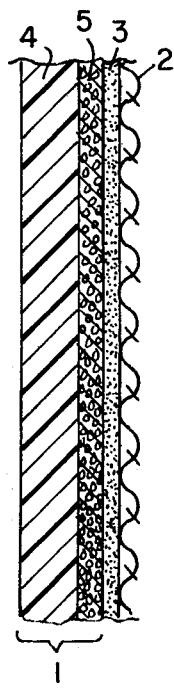
FIG. 1 is a view in cross-section of one embodiment of the improved open weave drapery fabric of this invention.
Figure 2:
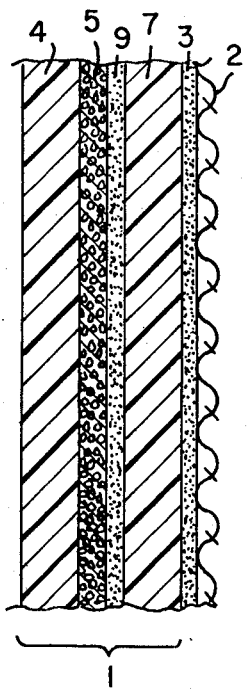
FIGS. 2 and 3 are views in cross-section of other embodiments of the improved open weave drapery fabric of this invention.

In another embodiment of this invention as shown in FIG. 2, the solar control film includes a second polymeric layer (7) which is adhesively-bonded by an adhesive layer (9) to the metal layer (5).

Figure 3:
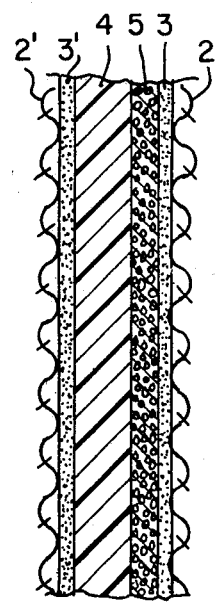
Figure 3:
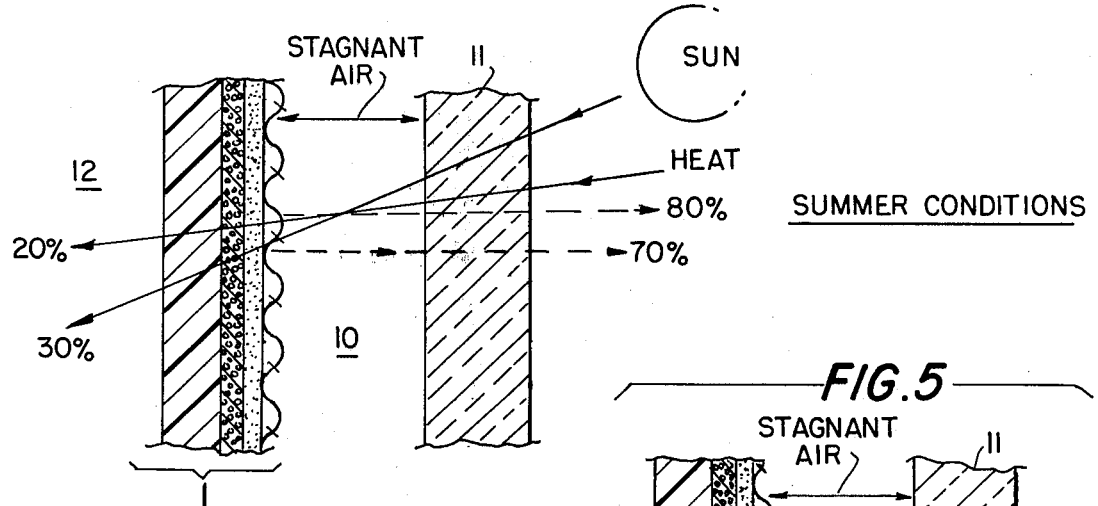
Figure 3:
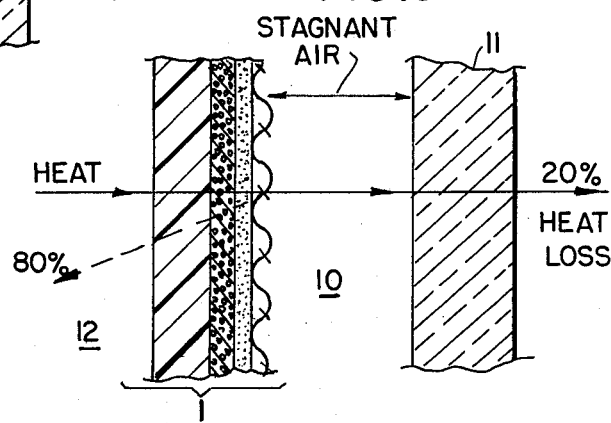

In the embodiment shown in FIG. 3, the solar control film (1) comprising polymeric layer (4) and metal layer (5) is sandwiched between two fabric layers (2, 2'), each of which is bonded to the solar control film by an adhesive layer (3, 3'). It will be obvious to those persons skilled in the art that other constructions involving multiple solar film and fabric layers can be made without departing from the invention.

The transparent films (4 and 7) utilized in the solar control film (1) are preferably polyesters. A highly preferred polyester is a polyethylene terephthalate film, e.g., Mylar brand by Dupont. This specific film is preferred because of its clarity, uniformity, toughness, strength and dimensional stability under widely varying temperature and humidity conditions. This film is also particularly receptive to a vapor-deposited metal coating. The transparent film may also be formed from polyvinyl chloride, cellulose acetate, cellulose acetate propionate, polyethylene, polypropylene, cellulose acetate butyrate, polystyrene, polybutyl acrylate and polycarbonate, among others. The stability of these films may be improved, if necessary or desirable, by known techniques, e.g., incorporating ultraviolet ray absorbers in the film itself or, preferably, in a coating applied over the vapor deposited film. Preferably, the solar control films should incorporate materials having the ability to screen ultraviolet radiation and also be stable to ultraviolet radiation. The solar control film and open weave fabric laminate should also be stable to common dry-cleaning and washing processes and temperatures.

Vapor deposition or coating of the solar control film with a metallized coating is carried out in the conventional manner. The amount of metal deposited on the transparent film is measured and controlled by the reduction in light transmission of the visible spectrum (about 4,000 to 8,000 Angstrom unit wavelength range), such that at least three percent (3%), but not more than fifty percent (50%), of the visible portion of the spectrum is still transmitted. This generally results in a highly reflective metallic layer (5) on the order of, but not limited to, 10 to 141 Angstroms thick. Suitable metals for vapor deposition include aluminum, zinc, copper, silver, gold, iron, zinc, beryllium, chromium, nickle, titanium, tungsten or alloys thereof. Preferably, for economic reasons and ease of vapor deposition, aluminum is a preferred metal for use in the solar control film.

The flexible adhesive or inner bonding strata (3 and 9) should, preferably, be cast from a thermosetting polyester in an organic solvent solution. Other preferred bonding stratum may consist of blends of rubbery butadiene-acrylonitrile, acrylics, rubber, polyurethanes, polyamides, vinyl, melamines, epoxies and fluroplastics. These systems can be either solvent or water-based and thermoplastic or thermosetting in nature. The adhesive may also be chemically cross-linked by suitable catalytic materials. The adhesive forming the inner bonding stratum should also be stable to common dry-cleaning and washing processes and temperatures. By way of example, a typical adhesive composition may comprise 100 parts of a polyester adhesive sold by Dupont as 46971 polyester adhesive combined with 1 to 10 parts of Dupont RC-805 or Dupont RC-803 modified isocyanate curing agent or equivalent in an organic solvent, such as toluol; methyl ethyl ketone; or tetrahydrofuran. Alternatively, adhesive compositions and curing agents sold under the trademark "Adcote" by Morton Chemical Company may be employed.

Pigments, dyes, and other coloring matter may be included in the adhesive compositions or the films to provide color variations to the solar control film and ultraviolet absorption properties. Typical ultraviolet absorbers include American Cyanamid UV 5411 and UV 284, and Abra-Geigy tinuvin P and tinuvin 328.

Although not critical, it has been found that a combined thickness for the solar control film and adhesive bonding stratum of the invention of about 0.0013" to about 0.025" is effective to accomplish the objects of the invention. Preferably, the thickness of the solar control film should be about 0.00008" to about 0.02". A particularly preferred thickness is about 0.00074". Preferably, the thickness of the bonding stratum should be about 0.00005" to about 0.005". A particularly preferred thickness is about 0.00035".

This invention envisions the use of any known method of laminating the materials to form the improved drapery fabric which is capable of bonding the flexible solar control film (1) to the decorative fabric (2). Typical methods include wet and dry laminations; in line and heat-sealable methods of application; gravure; reverse roll; air knife; rod and smooth roll techniques. The flexible solar control film may be applied to the decorative fabric at temperatures ranging from ambient to in excess of 300° F.

The method of applying the flexible solar control film to the decorative fabric is mainly determined by the type of adhesive utilized to form the flexible inner bonding stratum. For example, the utilization of a reverse roll coating device, having the capability of applying 40 lbs. per ream wet to the polyester substrate, either in a laminate structure or in a singular film material having see-through characteristics created by vacuum metallizing or sputtering techniques, would create the desired effect required for the substrate to be used for lamination to the open weave fabric. The lamination to the fabric may take place directly after formation of the solar control film or, alternatively, the film can be stored for subsequent lamination to the fabric by applying a suitable release material to the film.

Solvent drying techniques for the laminates, including conventional oven drying and infrared radiation, may be utilized.

The following are some non-limiting examples of methods of producing the improved open weave drapery of this invention.

EXAMPLE 1

A 14 gauge (0.00014" thick) polyester film (Mylar by Dupont) metallized to 30% visible light transmission at 5,500 Angstroms wavelength was produced by vacuum deposition (vapor pressure of $1 \times 10\ 4$ torrs.). The polyester film was metallized at a rate of 250 feet per minute using aluminum wire for metallization. The 14 gauge metallized polymeric film was laminated to an open weave fabric using a gravure coater applicator with a metering rod (No. 30) which applied 40 lbs. per ream of a polyester adhesive composition formed from Dupont 46971 adhesive and Dupont RC-805 curing agent. The drapery fabric was then dried in a two-zone oven in which Zone 1 was maintained at ambient temperatures and Zone 2 was maintained at 160° F. The film was then heat-activated at 290° F. and 100 psi at a rate of about 15 yards per minute of drapery fabric.

The new improved drapery fabric was then washed to improve the hand and drapability of the laminate. This washing step is required with most fabrics to improve this characteristic. The washing step may be accomplished by, but not limited to, either hot or cold water with or without the addition of detergent or soap.

The decorative fabric utilized in the foregoing example was Sorrento Style No. 1-348D, produced by Bayeaux, having a weight of 3.4 ounces per square yard and a percent open area of 60%. Other fabrics which can be used include, but are not limited to:

| | |
|---|---|
| Burlington | El Crero, Style 13240 |
| Bayeaux | Cinnamon, white |
| | Sorrento, black/white |
| United Merchants | 2 whites |
| Polylok | Style 1662 |
| Klein-Fab | Samoa beige; brown |
| | Kent white; beige |
| | 955 pink |
| | 764 gold |

EXAMPLE 2

A drapery fabric was produced in the same manner as Example 1 utilizing a flexible solar control film comprised of a 25 gauge (0.00025") metallized polyester film bonded to a 14 gauge (0.00014") transparent polyester film.

EXAMPLE 3

A drapery fabric was produced as in Example 1 utilizing a 0.00014" polyester film bonded with an adhesive strata to 0.00014" metallized polyester film.

The improved open weave drapery fabric of this invention unexpectedly exhibits superior properties with respect to the control of heat loss or gain and maintenance of light transmission through a window, when compared to the use of a solar control film or an open weave decorative fabric on the same window. Although not wishing to be limited to any theory, it is believed, as depicted in FIG. 4 and FIG. 5, that when the improved drapery fabric is hung in the normal fashion, the combination of the decorative fabric (2) laminated to the solar film (1) creates a stagnant air barrier (10) between the window (11) and the improved drapery fabric of the invention. The stagnant air barrier (10) acts as an added insulating layer and prevents the transmission of heat to and from the room (12).

During summer months, as shown in FIG. 4, the improved drapery fabric serves to reject about 70% of the sun's radiant heat energy and about 80% of the heat which would penetrate a room due to the difference between indoor and outdoor temperature conditions. During the winter months, as shown in FIG. 5, the improved drapery fabric combined with the stagnant air barrier (10) serves to retain about 80% of the total heat within the room.

EXAMPLE 4

The following data is based on information determined from charts or through calculations described in the 1972 ASHRAE *Handbook of Fundamentals*. The ASHRAE *Handbook of Fundamentals* is published by the American Society of Heating, Refrigerating and Air Conditioning Engineers.

To compare the relative merits of (a) solar film (equivalent metal content); (b) open weave drapes; (c) double strength glass; and (d) New Improved Open Weave Drapes, the shading coefficient, U factor, total heat gain and percent of heat retained that would otherwise be lost through glass must be determined.

The lowest total heat gain can be determined using this basic equation described in the ASHRAE book for each product and comparing the results. Total heat gain = shading coefficient × 216 BTU + U Factor × 20° F.

The 216 BTU's and the 20° F. temperature difference is based on west-facing windows at 4 P.M. standard time, at 40° North latitude on July 21 and a 95° F. outdoor temperature, 75° indoor temperature with a 7½ mph wind outdoors which has been set forth in ASHRAE as standard conditions.

The following is the total heat gain expected under standard conditions for (a) solar film (equivalent metal content); (b) open weave drapes; (c) double strength glass; and (d) New Improved Open Weave Drapes.

(a) Solar Adhere on the Glass Film (note that this film has the same metal content as the New Improved Open Weave Drapery).

shading coefficient = 0.35
U factor = 1.05
heat gain = 0.35 × 216 + 1.05 × 20° F. = 75.6 + 21 = 96.6 BTU/HR/SF.

Out of a possible heat gain of 237 BTU's, 96.6 BTU's are permitted to pass through glass. The rest are rejected.

(b) Open Weave Drapes (as described in ASHRAE data)

shading coefficient = 0.65
U factor = 0.81
heat gain = 0.65 × 216 + 0.81 × 20 = 138.45 + 16.2 = 154.65 BTU/HR/SF.

Out of a possible heat gain of 237 BTU's, 154.65 BTU's are permitted to pass through glass. The rest are rejected.

(c) Double Strength Glass (double strength is used as a standard and permits a total heat gain of 237 BTU's.

shading coefficient = 1
U factor = 1.06
heat gain = 1 × 216 + 1.06 × 20 = 237 BTU/HR/SF.

(d) New Improved Open Weave Drapery shading coefficient = 0.3
U factor = 0.2
heat gain = 0.3 × 216 + 0.2 × 20 = 64.8 + 4 = 68.8 BTU/HR/SF.

Out of a possible heat gain of 237 BTU's, 68.8 BTU's are permitted to pass through glass, the rest are rejected.

It can readily be seen from the calculations presented that the Improved Open Weave Drapery has the lowest total heat gain and is a significantly improved product over the solar film adhered to window glass and regular open weave drapery.

The U-factor determines the heat loss through glass. Using the ASHRAE methods, the savings through glass achieved by solar film (equivalent metal content), open weave drapes, and improved open weave drapes can be determined.

Solar Film (equivalent metal content)

$$(1.06 - 1.05/1.06) \times 100 = 1\%$$

Open Weave Drapes (as described in ASHRAE)

$$(1.06 - 0.81/1.06) \times 100 = 23.5\%$$

Improved Open Weave Drapes $$(1.06 - 0.2/1.06) = 81\%$$

From these calculations it can readily be seen that the amount of heat retained by Improved Open Weave Drapes is significantly better than the heat retained by the other products.

What is claimed:

1. A window covering system providing improved insulating characteristics comprising an open weave drapery fabric, said decorative material having at least about a 5% open area, a flexible solar control film having at least one metallized surface layer, a flexible inner bonding stratum joining said drapery fabric and said solar control film to form a window covering, said solar control film having a visible light transmission level which permits the transmission of visible light through the open area of the open weave drapery fabric but substantially blocks the transmission of air therethrough, said window covering system being positioned on the interior side of a window to form a stagnant air barrier between said window and said window covering system so as to provide said improved insulating characteristics.

2. The window covering of claim 1, wherein the solar control film and the bonding stratum have a combined thickness of about 0.00013 to about 0.025 inches.

3. The window covering of claim 1, wherein the visible light transmission level of the solar control film is from about 3% to about 50%.

4. The window covering of claim 1, wherein the solar control film is comprised of a first transparent film having at least one metallized surface and a second transparent film bonded to said metallized surface.

5. The window covering of claim 1, wherein the solar control film comprises a transparent film having at least one metallized surface layer.

6. The window covering of claim 5, wherein the metallized surface layer is aluminum.

7. The window covering of claim 5, wherein the transparent film is a polyester.

8. A window drapery, comprising an open weave decorative drapery fabric, said drapery fabric having at least about a 5% open area, a flexible solar control film, said solar control film comprising a transparent polyester film having at least one metallized surface layer, said solar control film having a visible light transmission level of about 3% to about 50%, a flexible inner bonding stratum joining said decorative drapery fabric and said solar control film to form a window drapery, said solar control film and said bonding stratum having a combined thickness of about 0.0013 to about 0.025 inches, said window drapery being capable of transmitting visible light but substantially blocking the transmission of air therethrough, said window drapery adapted to be hung on the interior side of a window to create a stagnant air insulating barrier between said window and said window drapery.

9. The window covering of claim 8, wherein the metallized surface layer is aluminum.

10. The window covering of claim 8, wherein the solar control film is comprised of a first transparent film having at least one metallized surface and a second transparent film bonded to said metallized surface.

* * * * *